US007366857B2

(12) United States Patent
Cochran et al.

(10) Patent No.: US 7,366,857 B2
(45) Date of Patent: Apr. 29, 2008

(54) INTERNAL DISK ARRAY MIRROR ARCHITECTURE

(75) Inventors: Robert A Cochran, Sacramento, CA (US); David E Oseto, Newcastle, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 303 days.

(21) Appl. No.: 10/835,115

(22) Filed: Apr. 30, 2004

(65) Prior Publication Data

US 2005/0246489 A1 Nov. 3, 2005

(51) Int. Cl.
*G06F 12/06* (2006.01)

(52) U.S. Cl. .......................... 711/162; 711/114; 714/6; 714/4

(58) Field of Classification Search ................ 711/114, 711/162, 112, 203, 202, 165, 161; 707/204; 714/4, 6
See application file for complete search history.

(56) References Cited

U.S. PATENT DOCUMENTS

| | | | | |
|---|---|---|---|---|
| 5,901,327 A * | 5/1999 | Ofek | ............................. | 710/5 |
| 6,009,481 A * | 12/1999 | Mayer | .......................... | 710/33 |
| 6,154,847 A * | 11/2000 | Schofield et al. | .............. | 714/4 |
| 6,209,002 B1 * | 3/2001 | Gagne et al. | ............... | 707/204 |
| 7,240,238 B2 * | 7/2007 | Yanai et al. | .................. | 714/7 |
| 2005/0132155 A1 * | 6/2005 | Kasako | ....................... | 711/162 |
| 2006/0004894 A1 * | 1/2006 | Takahashi et al. | .......... | 707/204 |

OTHER PUBLICATIONS

Jen Bozman—Escon An Aid To Remote Disks (3 pp.) V. 25, N. 1, p. 29, Jan. 7, 1991.*

Symmetrix Remote Data Facility (SRDF) Product Guide, P/N 200-999-554 Rev A, EMC Corporation, Hopkinton, Mass., Sep. 1994, 105 pp.*

"EMC Introduces Symmetrix 5500 Continuous Operation Disk Storage for Mission Critical IBM Mainframe Market," News from EMC Corporation, Hopkinton, Mass., Nov. 10, 1992, 3 pages.*

* cited by examiner

*Primary Examiner*—Pierre-Michel Bataille

(57) ABSTRACT

A disk array having an internal mirror architecture may include: a plurality of disk drives configured to provide a primary logical storage device (LDEV), a first instance of an internally-mirroring secondary LDEV and a second instance of an internally-mirroring secondary LDEV.

55 Claims, 12 Drawing Sheets

INTERNAL DISK ARRAY MIRROR ARCHITECTURE

BACKGROUND OF THE INVENTION

A type of data storage architecture according to the Background Art is an internal mirror architecture. FIG. 1 is a block diagram of a disk array 100 having an internal mirror architecture according to the Background Art. Disk array 100 includes a controller 102 and a plurality of disk drives (disks not depicted individually) configured to provide a primary logical storage device (LDEV) 104 and a secondary LDEV 106. Secondary LDEV (hereafter, S-LDEV) 106 represents a data mirror of primary LDEV (hereafter P-LDEV) 104. A pointer 105 is mapped from P-LDEV 104 to S-LDEV 106 to designate the logical flow of data from the P-LDEV 104 to S-LDEV 106. At certain times, controller 102 causes P-LDEV 104 to make data updates (using pointer 105) to S-LDEV 106.

A logical storage device, e.g., each of 104 and 106, can represent part or all of one or more disk drives, respectively, in the array thereof. P-LDEV 104 and disk controller 102 have a bidirectional connection to a control bus 108 while there typically is a uni-directional connection from bus 108 to S-LDEV 106 during normal primary to secondary volume data flow.

A source of data, e.g., application server 118, stores data on disk array 100 via sending data writes to a logical unit (LU) X 110 (hereafter, LU_X). LU_X 110 represents a mapping by controller 102 of a pointer 112 from a first port to P-LDEV 104. Application server 118 typically has read/write access to LU_X 110.

Disk array 100 can represent a node N in a storage hierarchy. A node below (or, in other words, downstream from) N in the storage hierarchy is referred to as node N+1. Node N+1 can be represent, e.g., another storage device, a data mining server, etc. Here, for the purposes of discussion, it will be assumed that node N+1 is a downstream (e.g. host computer) node 120. Downstream node 120 obtains data from disk array 100 via data reads made to a logical unit (again, LU) Y 114 (hereafter, LU_Y). LU_Y 114 represents a mapping by controller 102 of a pointer 116 from a second port to S-LDEV 106. Downstream node 120 typically has read-only access to LU_Y 114.

A drawing simplification is noted. Controller 102 generates the logical mapping that is illustrated in FIG. 1 as LU_X 110 and pointer 112, as well as LU_Y 114 and pointer 116. So, in actuality, controller 102 is interposed between application server 118 and P-LDEV 104, and between downstream node 120 and S-LDEV 106. But for simplicity of illustration, controller 102 is not drawn as part of the path that includes LU_X 110 and pointer 112, nor as a part of the path that includes LU_Y 114 and pointer 116.

After initial data copy initialization, mirrored pair 104 & 106 can assume two major states: pair; and suspend. In the pair state, controller 102 will copy new data from P-LDEV 104 to S-LDEV 106 for the purpose of maintaining S-LDEV 106 as a mirror of P-LDEV 104. Typically, such updating is done opportunistically and/or out of order (OOO), e.g., disk controller 102 will only divert its finite resources to keeping S-LDEV 106 updated when it has bandwidth to spare, and when the updating occurs then it is done by periodic copying of changed tracks based on a bitmap which does not preserve the order of writes from server 118. Hence, the data on S-LDEV 106 is inconsistent relative to the data on P-LDEV 104.

A user, e.g., an administrator of disk array 100, might desire to have consistent data on S-LDEV 106 available to downstream node 120. This can be accomplished by requesting a transition to a suspend state. In the suspend state, the data on S-LDEV 106 accurately mirrors the data in existence on P-LDEV 104 as of when the suspend command is executed. As part of a transition from the pair state to the suspend state, architecture 100 passes though a synch copy state 206. In synch copy state 206, controller 102 completes a synch copy that provides S-LDEV 106 with any incremental changes in data that might be needed based on a bitmap of changed tracks maintained for P-LDEV 104.

During the suspend state, application server 118 can write new data to P-LDEV 104, but the mirroring of those writes to S-LDEV 106 is suspended; hence, the term "suspend" implies the suspension of data updating from P-LDEV 104 to S-LDEV 106. Any writes to P-LDEV 104 during the suspend state are tracked in a changed-track bitmap. Likewise, as S-LDEV 106 is writable by downstream node 120 while in suspend state, S-LDEV 106 also keeps a changed-track bitmap.

A user might wish to obtain more current data on, e.g., S-LDEV 106 than the static (and progressively more stale as time elapses) data available on it during the suspend state. This can be accomplished by requesting a resynchronization in the form of a change back to the pair state. As part of the transition from the suspend state to the pair state, architecture 100 passes through a discard state and then through the synch state. In the discard state, arrangements are made for data to flow (subsequently at the synch state) from either P-LDEV 104 to S-LDEV 106 (a normal resynch; more common) or from 106 to 104 (a reverse resynch; less common). For a normal resynch, changes to S-LDEV 106 are discarded in favor of changes made to P-LDEV 104. For a reverse resynch, changes on P-LDEV 104 are discarded in favor of changes made to S-LDEV 106.

SUMMARY OF THE INVENTION

At least one embodiment of the present invention provides a disk array having an internal mirror architecture. Such a disk array may include: a plurality of disk drives configured to provide a primary logical storage device (LDEV), a first instance of an internally-mirroring secondary LDEV and a second instance of an internally-mirroring secondary LDEV.

Additional features and advantages of the invention will be more fully apparent from the following detailed description of example embodiments and the accompanying drawings.

The remaining drawings are: intended to depict example embodiments of the invention and should not be interpreted to limit the scope thereof.

Figure 3A:
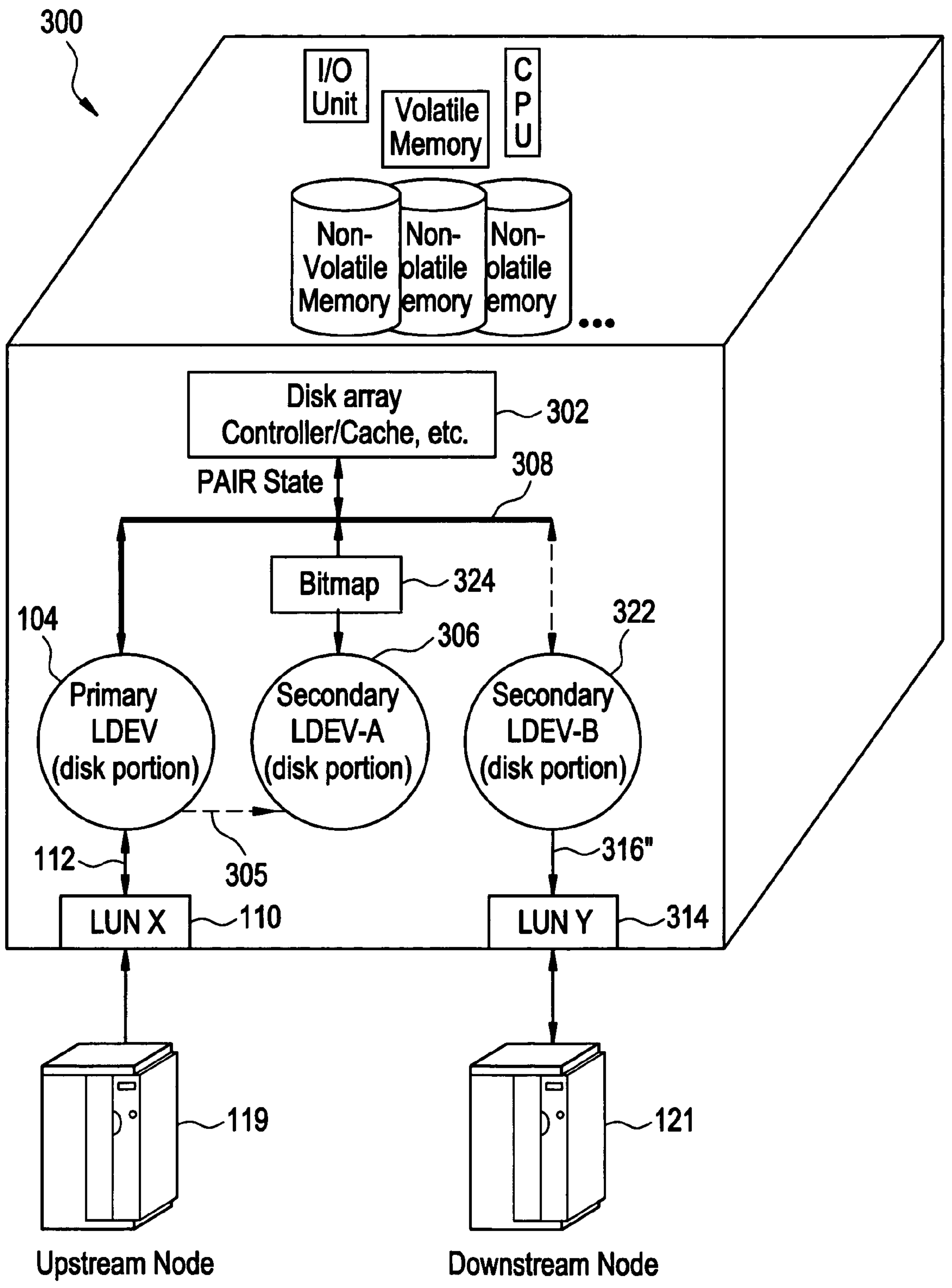

FIG. 3A is a block diagram of a disk array having an internal mirror architecture according to at least one embodiment of the present invention.

Figure 3B:
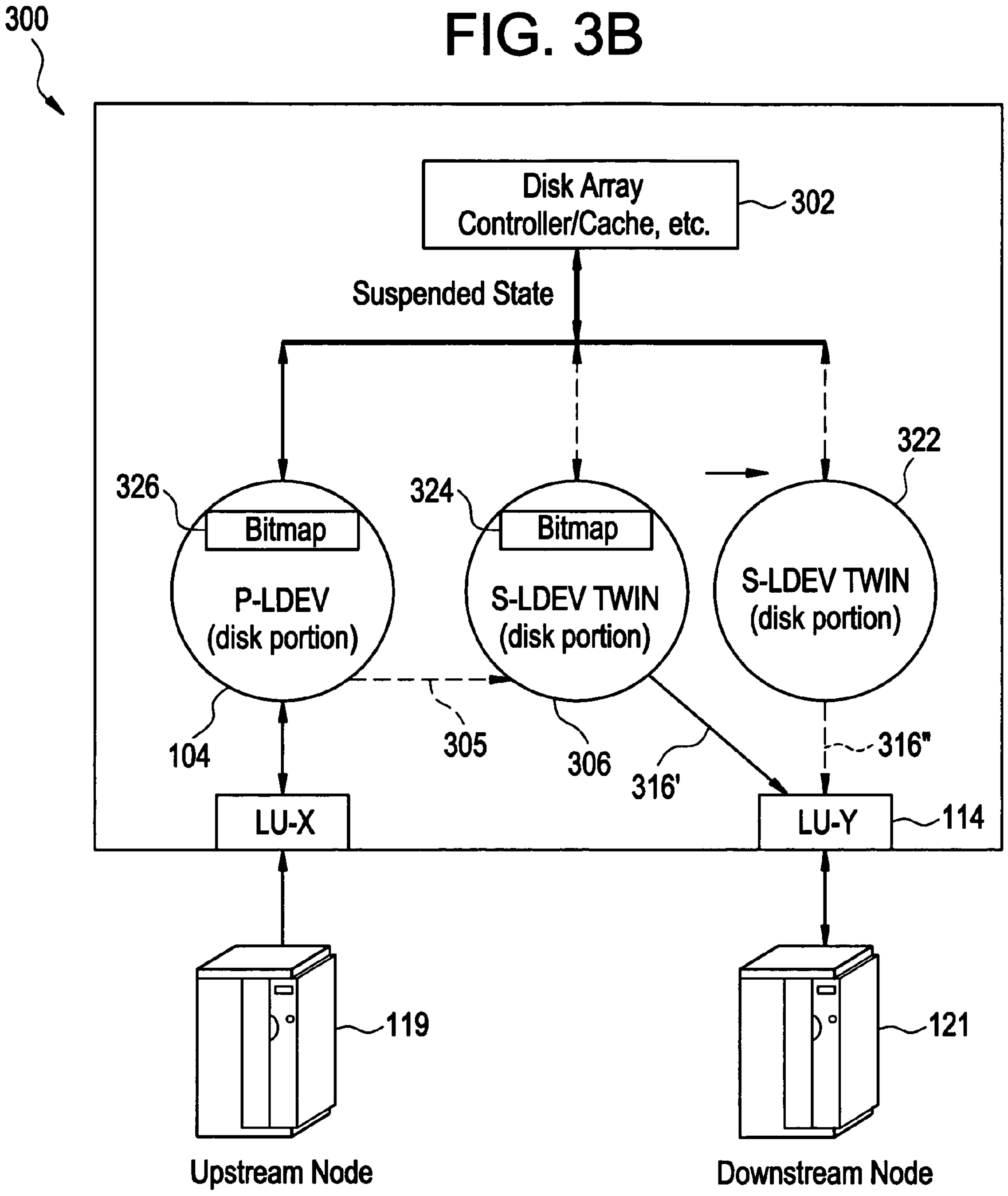

FIG. 3B is a version of FIG. 3A (and hence is a block diagram) illustrating aspects of the response by the disk array to a suspend request, according to at least one embodiment of the present invention.

Figure 3C:
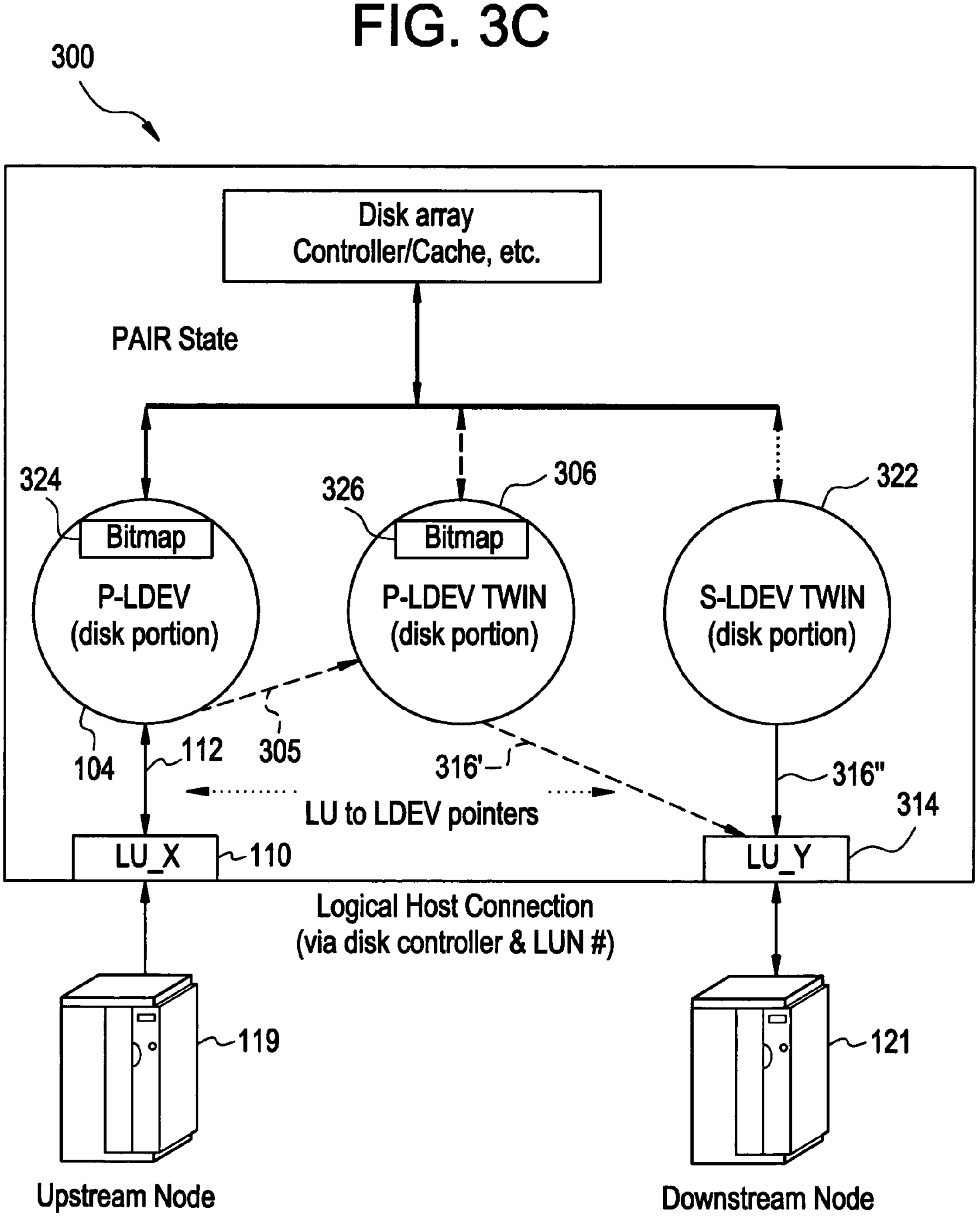

FIG. 3C is a version of FIG. 3A (and hence is a block diagram) illustrating aspects of the response by disk array to a request to transition from a suspend mode to a pair mode, according to at least one embodiment of the present invention.

Figure 4A:
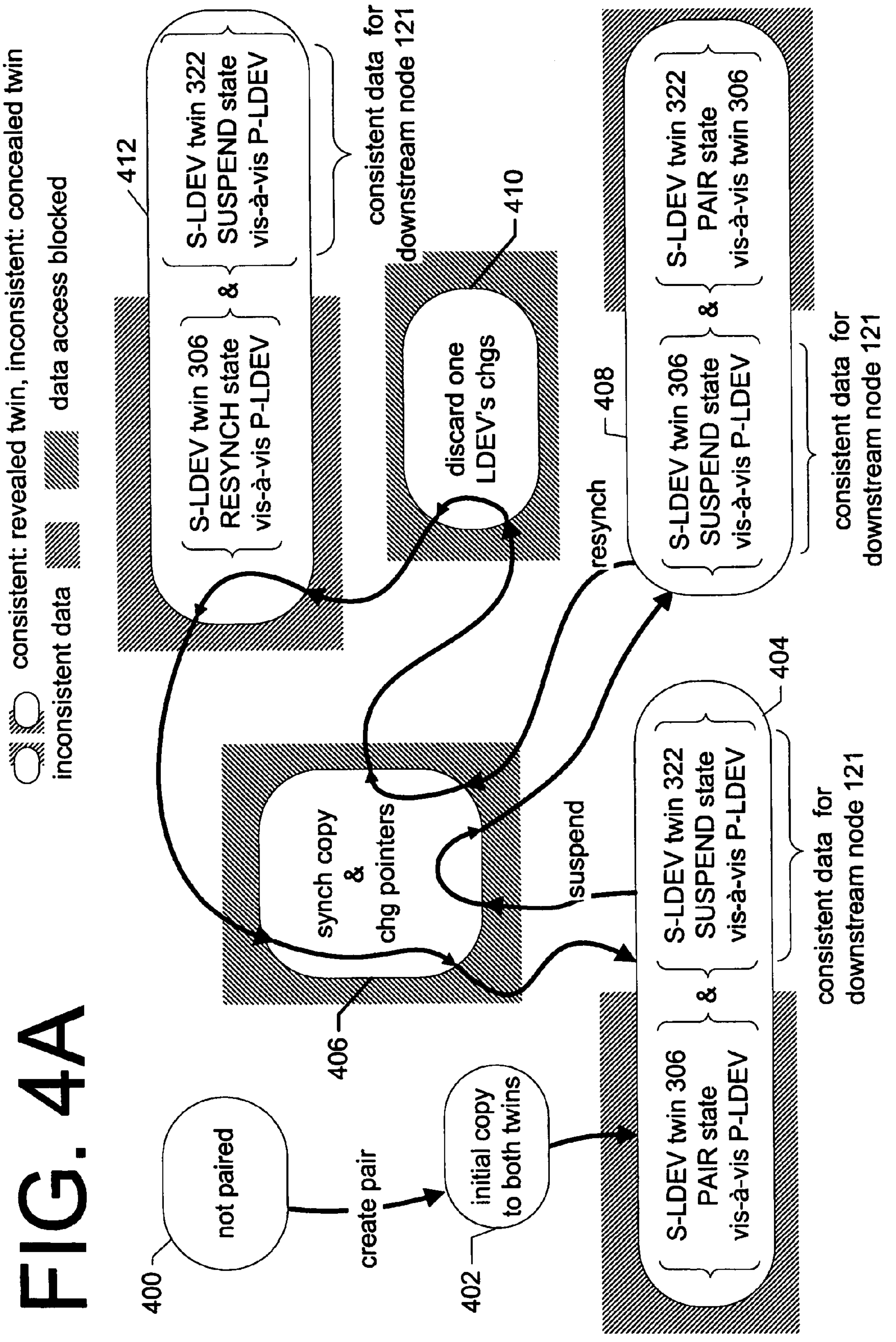

FIG. 4A is a state diagram (in terms of data being consistent/inconsistent) for twin S-LDEVs of a disk array having an internal mirror architecture, according to at least one embodiment of the present invention.

Figure 5:
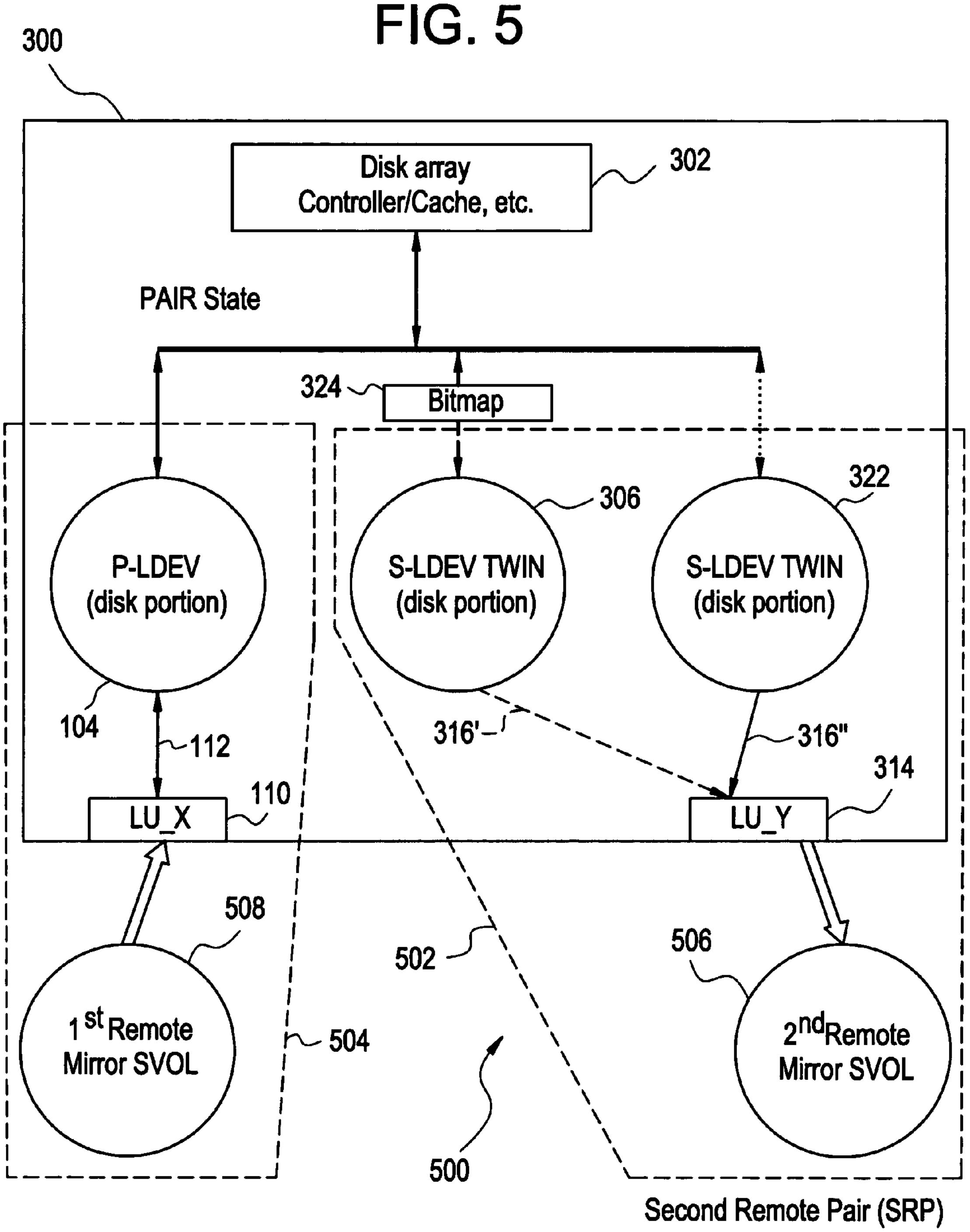

FIG. 5 is a block diagram of a storage hierarchy, according to at least one embodiment of the present invention.

FIGS. 6A-6D are sequence diagrams of methods of transition into various states for twin S-LDEVs of a disk array having an internal mirror architecture, according to at least one embodiment of the present invention, respectively.

Figure 7A:
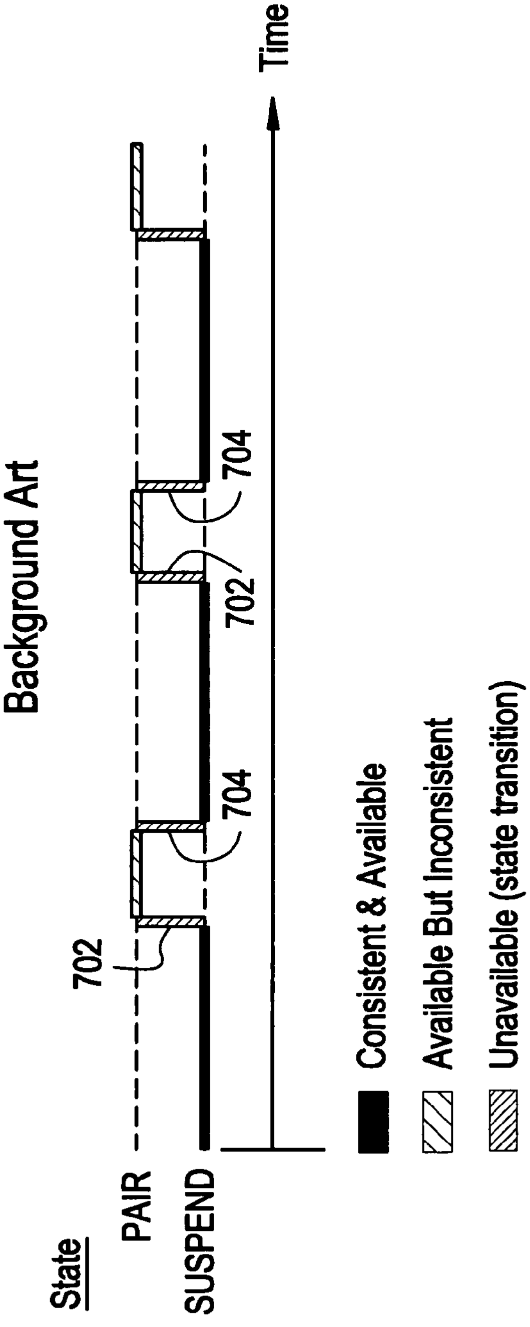

FIG. 7A is a depiction of data consistency/inconsistency for a singleton S-LDEV of a disk array having an internal mirror architecture, according to the Background Art.

Figure 7B:
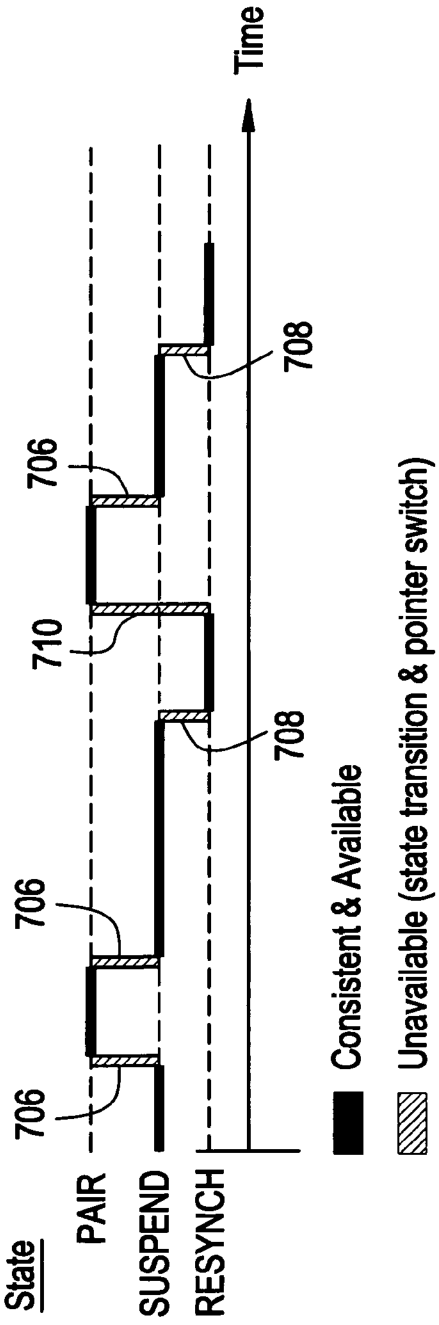

FIG. 7B is a depiction of a data consistency/inconsistency for twin S-DLEVs of a disk array having an internal mirror architecture, according to at least one embodiment of the present invention.

Unless explicitly noted, the drawings are not to be considered as drawn to scale.

DETAILED DESCRIPTION OF EXAMPLE EMBODIMENTS

Figure 1:
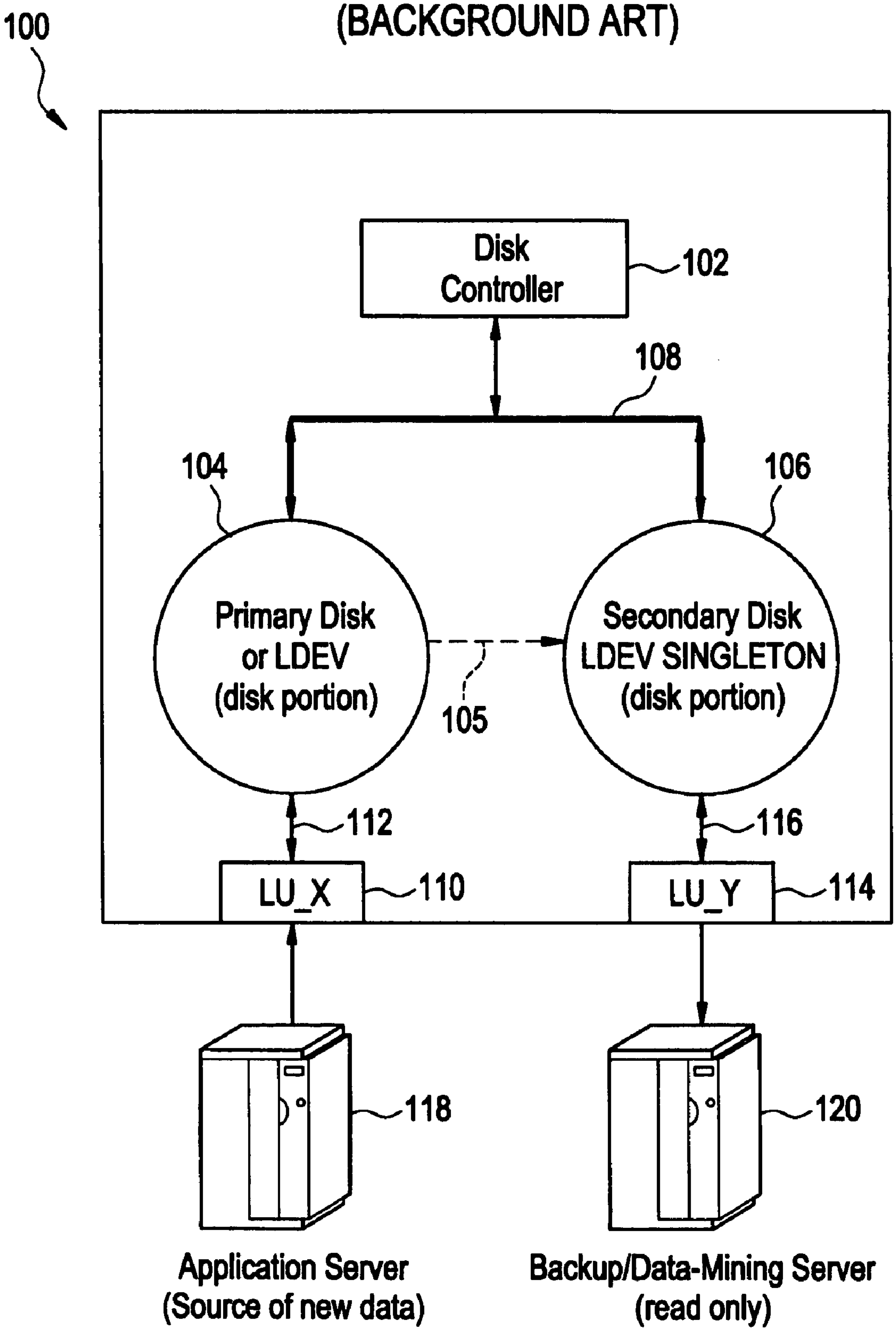
FIG. 1 is a block diagram of a disk array having an internal mirror architecture, according to the Background Art.

In developing embodiments of the present invention, the following problems (as discussed in the following paragraphs) with the Background Art were recognized, the physics thereof determined, and the problem overcome. Usually, the internal-mirror singleton S-LDEV architecture of Background Art FIG. 1 forwards writes asynchronously from P-LDEV (again, primary logical device) 104 to S-LDEV (again, secondary logical device) 106. While data can be read from S-LDEV 106 during the pair state, such data is rendered inconsistent as a representation of the data on P-LDEV 104 (usually) as of when the first write is received by P-LDEV 104 once the pair state has been entered (which typically occurs almost immediately). This is because of the opportunistic and/or OOO (again, out of order) manner of updating S-LDEV 106 during the pair state. Stated differently, there is (usually) an inconsistency between the data on S-LDEV 106 and P-LDEV 104 in the pair state. This a problem because it reduces or eliminates the confidence of downstream node 120 in the data read from S-LDEV 106 during the pair state. Alternatively, it is a problem if downstream node 120 only desires consistent data because then downstream node 120 must wait until a suspend state is achieved to be confident of reading consistent data.

Figure 2:
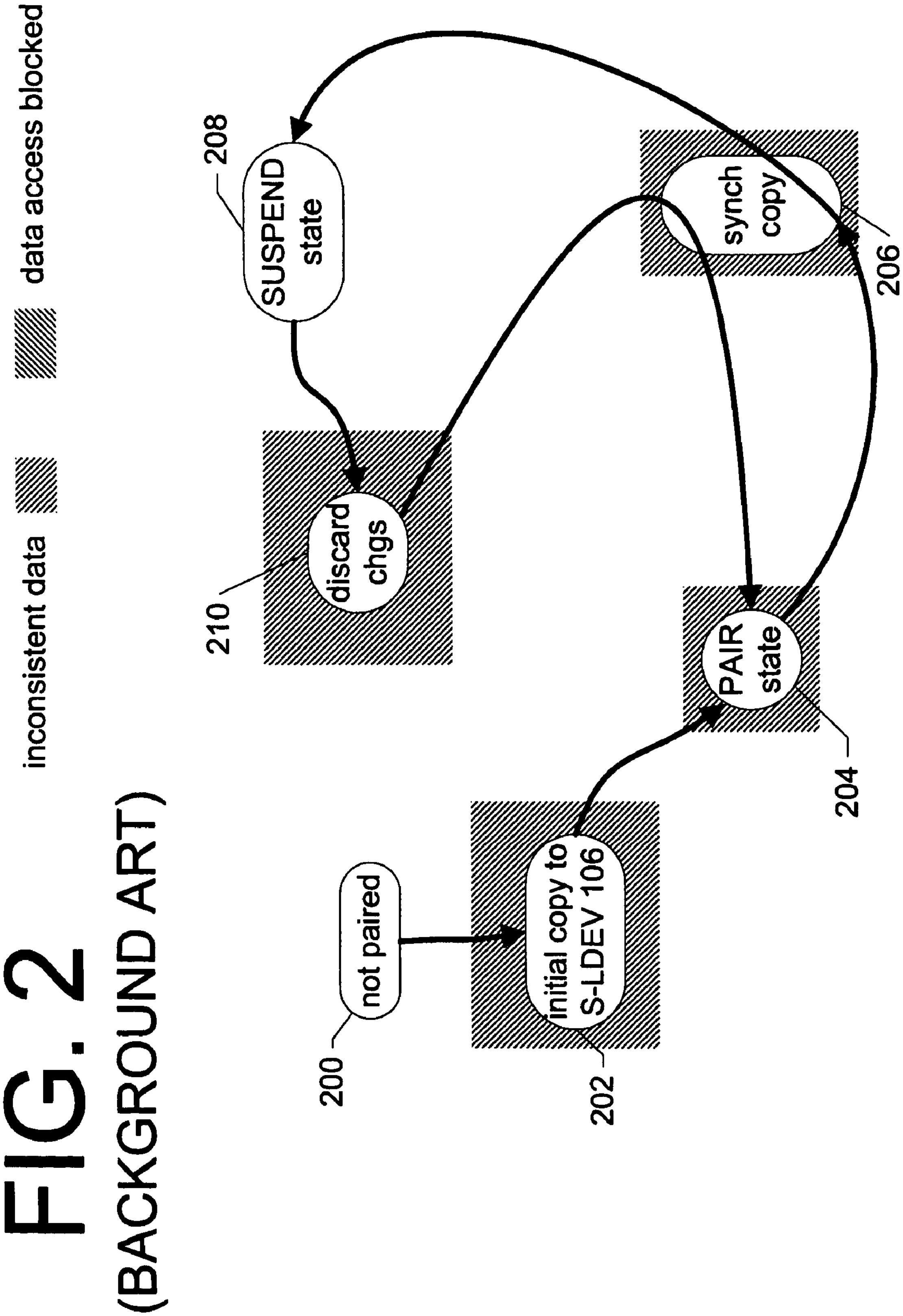
FIG. 2 is a state diagram (in terms of data being consistent/inconsistent) for an S-LDEV of the disk array of FIG. 1, according to the Background Art.

The latter problem, namely of there only being consistent data available on S-LDEV 106 while in the suspend state, is illustrated in FIG. 2, which is a state diagram of data (in terms of being consistent/inconsistent) for S-LDEV 106 of disk array 100 having the internal mirror architecture according to the Background Art. In FIG. 2, from a pre-internal-mirror state 200 in which P-LDEV 104 and S-LDEV 106 are not related, a transition is made to an initial-copy state 202. In initial copy state 202, an initial OOO (again, out-of-order) copy of the data on P-LDEV 104 is made to S-LDEV 106. From initial copy state 202, a transition is made to the pair state (denoted as item 204). Via the synch copy state (denoted as item 206), a transition is made from pair state 204 to the suspend state (denoted as item 208). In synch copy state 206, an OOO synch copy from P-LDEV 104 to S-LDEV 106 occurs. Lastly, via the discard (denoted as item 210) and then synch state 206, a transition is made from suspend state 208 back to pair state 204. In discard state 210, changes on one of the LDEVs 104 and 106 (as reflected in respective bitmaps) are discarded. Then in synch copy state 206, an OOO synch copy occurs from the LDEV whose changes were retained to the LDEV whose changes were discarded.

In states 202, 204, 206 and (in the circumstance of a normal resynch) 210, the data on S-LDEV 106 is inconsistent with the data on P-LDEV 104, as indicated by a first type of cross-hatching around the respective states. It is to be noted that if there is a reverse resynch (again, where changes made to S-LDEV 106 are copied to P-LDEV 104), then state 210 would present consistent data from the perspective of S-LDEV 106. But as noted above, a reverse resynch are less common than a normal resynch, in which (again) the changes made to S-LDEV 106 are discarded and a synch copy is made from P-LDEV 104 to S-LDEV 106.

Inspection of FIG. 2 reveals that data on S-LDEV 106 of the Background Art is inconsistent in 4 out of 5 states. It can be advantageous to decrease the relative amount of time that downstream node 120 has inaccurate data available to it on S-LDEV 106. At least one embodiment according to the present invention significantly reduces the relative amount of time which data available to downstream node 120 from a disk array with an internal mirror architecture is inaccurate.

Discussions of embodiments according to the present invention now follow.

FIG. 3A is a block diagram of a disk array 300 having an internal mirror architecture, according to at least one embodiment of the present invention.

In FIG. 3A, disk array 300 includes a controller 302 and a plurality of disk drives configured to provide a primary logical storage device (again, P-LDEV) 104; and twin instances (items 306 and 322) of secondary logical storage devices (again, S-LDEVs). Each of twin S-LDEVs 306 and 322 is used to mirror the data on P-LDEV 104. Using a pointer 305, controller 302 causes S-LDEV 306 to be updated from P-LDEV 104. And controller 302 causes S-LDEV 322 to be updated from S-LDEV 306, as will be discussed below.

A logical storage device, e.g., each of 104, 306 and 322, can represent part or all of one or more disk drives, respectively, in the array thereof. P-LDEV 104, disk controller 302, and twin S-LDEVs 306 and 322 each have a bidirectional connection to a control bus 308.

Hardware components of disk arrays, e.g., disk array 300, in general, are known. Disk array 300 is depicted as a cube, the front face of which shows the functional blocks/units 104, 306, 322, 302, 308, etc. The top face, however, depicts typical hardware components of a disk array, e.g., disk array 300, which can include a CPU/controller, an I/O unit, volatile memory such as RAM and non-volatile memory media such disk drives and/or tape drives, ROM, flash memory, etc.

Disk array 300 can represent a node N in a storage hierarchy, e.g., a storage area network (SAN). A node above (or, in other words, upstream from) node N in the storage hierarchy, namely node N−1, can represent a source of data to be written to P-LDEV 104 and can be, e.g., application server 118 (mentioned above in the discussion of the Background Art), a P-LDEV (or, in other words, a primary volume) in a remote mirror architecture for which P-LDEV 104 takes the role of S-LDEV (or, in other words, a secondary volume), etc. Such an upstream node N is given item number 119 in FIG. 3A, and can store data on disk array 300 via sending write commands (hereafter, writes) to a logical unit (LU) X 110 (hereafter, LU_X). LU_X 110 represents a mapping by controller 302 of a pointer 112 from a first port assigned to upstream node 119 to P-LDEV 104. Upstream node 119 typically has read/write access to LU_X 110.

A node below (or, in other words, downstream from) node N in the storage hierarchy, namely node N+1 can be represented by, e.g., another storage device (such as a secondary volume in a remote mirror architecture for which twin S-LDEVs 306 and 322 collectively represent the primary volume), a data mining server, etc. Such a downstream node is given item number 121 in FIG. 3A. Downstream node 121 obtains data from disk array 300 via data reads made to a logical unit (again, LU) Y 314 (hereafter, LU_Y). LU_Y 314 represents a mapping by controller 302 of a pointer 316 (shown as 316" in FIG. 3A, as will be explained below) selectively from a port assigned to downstream node 121 to one of twin S-LDEV 306 and twin S-LDEV 322, as will be discussed in more detail below.

Downstream node 121 typically has read-only access to LU_Y 314 during the pair state, and read/write access during the suspend state.

The drawing simplification mentioned above is also present in FIGS. 3B-3C and 5. More particularly, controller 302 generates the logical mapping that is illustrated in FIGS. 3A-3C and 5 as LU_X 110 and pointer 112, as well as LU_Y 314 and pointer 316. So, in actuality, controller 302 is interposed between downstream node 119, etc., and P-LDEV 104, and between downstream node 121, etc. and each of twin S-LDEV 306 and twin S-LDEV 322. But for simplicity of illustration, controller 102 is not drawn as part of the path that includes LU_X 110 and pointer 112, nor as a part of the path that includes LU_Y 314 and pointer 316.

It is to be noted that pointers 316 and 305 represent manipulations of memory locations, that can be instantiated, changed, deleted, etc., almost instantaneously. This contrasts with, e.g., a physical cable connected externally between the port associated with LU_Y 314 and 121, as well as between the port associated with LU_X 110 and 119. Also, pointer 316 permits the port associated with LU_Y 314 to be used with both of twin S-LDEVs 306 and 322. Use of external physical cabling instead of pointers would necessitate, e.g., use of LU_Y 314 with twin S-LDEV 306 and associating a third port with another LU, e.g., LU_Z, for use with twin S-LDEV 322. The changing of pointers 316 and 305 would be analogous to manual reconfiguring of the external cable connections, which by contrast would be much slower and prone to misconnection.

FIG. 4A is a state diagram (in terms of data being consistent/inconsistent) for twin S-LDEVs of a disk array having an internal mirror architecture, according to at least one embodiment of the present invention.

In FIG. 4A, from a pre-internal-mirror state 400 in which P-LDEV 104 and twin S-LDEVs 306 and 322 are not related, a transition is made to an initial-copy state 402. In initial-copy state 402, an initial OOO (again, out-of-order) copy of the data on P-LDEV 104 is made to each of twin S-LDEVs 306 and 322.

From initial-copy state 402, a transition is made to a pair state 404. In pair state 404, twin S-LDEV 306 has a pair relationship to P-LDEV 104 but twin S-LDEV 322 is in a suspend state relative to P-LDEV 104. The effect is that the data on twin S-LDEV 306 is inconsistent (as indicated by cross-hatching in FIG. 4A), but the data on twin S-LDEV 322 is consistent and static (as indicated by the absence of cross-hatching). Via appropriate configuration of pointer 316 (as 316"), access to twin S-LDEV 322 can be given to downstream node 121. In contrast, Background Art singleton S-LDEV 106 can provide only inconsistent data during the pair state.

From pair state 404, a user (e.g., an administrator of disk array 300) can request transition to a suspend state 408, which is reached via a synch & point state 406. In synch & point state 406, an OOO synch copy is made from P-LDEV 104 to twin S-LDEV 306, then pointer 316 is changed to point to twin S-LDEV 306 (indicated as 316'). Because the synch copy is OOO and pointer 316 is changed, access by downstream node 121 to each of twin S-LDEVs 306 and 322 is blocked in synch & point state 406 (as indicated by cross-hatching).

In suspend state 408, twin S-LDEV 306 has a suspend relationship with P-LDEV 104. Also in suspend state 408, twin S-LDEV 322 has a pair state with respect to the data on its twin, namely S-LDEV 306. The effect is that the data on twin S-LDEV 306 is consistent and static (as indicated by the absence of cross-hatching), but the data on twin S-LDEV 322 is inconsistent (as indicated by the presence of cross-hatching). The pointer change made in synch & point state 406 now gives downstream node 121 access to twin S-LDEV 306.

From suspend state 408, a user can request a transition to pair state 404, which is reached via a resynch state 412. As mentioned above, a resynch can be normal or reverse. Regardless of which type of resynch is requested, however, the transition from suspend state 408 to resynch state 412 is reached via synch & point state 406 followed by a discard state 410. Reaching synch & point state 406 from suspend state 408 results in an OOO synch copy being made (if needed at that time) from twin S-LDEV 306 to twin S-LDEV 322, and pointer 316 being set to point to twin S-LDEV 322 (indicated as 316").

As part of the resynch request, disk array 300 enters discard state 410 from synch & point state 406. In discard state 410, mapped changes that have been made to one of twin S-LDEV 306 or P-LDEV 104 are discarded. Again, a normal resynch discards the mapped changes to twin S-LDEV 306, while a reverse resynch discards the mapped changes to P-LDEV 104.

In resynch state 412, a resynch copy is made from P-LDEV 104 to twin S-LDEV 306 (for a normal resynch) or from twin S-LDEV 306 to P-LDEV 104 (for a reverse resynch). This makes the data on twin S-LDEV 306 inconsistent, which is indicated by cross-hatching. Also in resynch state 412, twin S-LDEV 322 is in a suspend relationship with P-LDEV 104. More particularly, the consistent static data on twin S-LDEV 322 in resynch state 412 is the same as the consistent static data that was on twin S-LDEV 306 in the preceding suspend state 408. The pointer change made in the preceding synch & point state 406 now gives downstream node 121 access to twin S-LDEV 322. While disk array 100 of the Background Art can respond to a resynch request, there is no state of disk array 100 that is comparable to resynch state 412.

From resynch state 412, disk array 300 transitions to synch & point state 406. Reaching synch & point state 406 from resynch state 412 results in an OOO synch copy being made from twin S-LDEV 306 to twin S-LDEV 322, and pointer 316 being set to point to twin S-LDEV 322 (indicated as 316"). When synch & point state 406 is reached from resynch state 412, disk array 300 then transitions to pair state 404.

Discussion now returns to FIG. 3A. During initial-copy state 402, upstream node 119 writes an initial amount of data to P-LDEV 104. Subsequently, controller 102: clears any bitmaps for S-LDEV 306 and S-LDEV 322; sets pointer 305 to point from P-LDEV 104 to both of twin S-LDEVs 306 and 322; and then causes the data on primary volume 104 to be copied to each of S-LDEV 306 and S-LDEV 322. Also during initialization, reads attempts by downstream node 121 to LU_Y 314 are refused by controller 302.

Further during initial-copy state 402, pointer 316 is mapped from LU_Y 314 to one of the twin S-LDEVs 306 and 322, e.g., 322 (pointer 316 accordingly being illustrated with item number 316" in FIG. 3A to indicate the mapping to twin S-LDEV 322). And after all of the data from P-LDEV 104 is copied to S-LDEV 306 and S-LDEV 322, pointer 305 is disabled. Lastly, a track-level bitmap (also referred to by some as a change-tracking map or a delta-tracking map) 324 is started on and for S-LDEV 306.

Pair state 404 follows initial-copy state 402, hence the label "PAIR state" is illustrated in FIG. 3A. During pair state 404, upstream node 119 can write data to P-LDEV 104. Controller 302 operates to keep S-LDEV 306 updated relative to P-LDEV 104. But S-LDEV 322 is not updated when S-LDEV 306 is updated. Rather, twin S-LDEV 322 has a suspend relationship in pair state 404 relative to P-LDEV 104, and any updates to twin S-LDEV 306 are tracked via track-level bitmap 324. Typically, such updating of twin S-LDEV 306 is done opportunistically and/or out of order (OOO). Hence, in the pair state, the data on S-LDEV 306 is not consistent with the data on P-LDEV 104.

In contrast to the Background Art, the consistency of the data on twin S-LDEV 306 during pair state 404 does not represent the same problem as when S-LDEV 106 of the Background Art has inconsistent data in pair state 204 because of the presence of twin S-LDEV 322. In pair state 404, downstream node 121 is not given access to twin S-LDEV 306 during the pair state, but instead is given access to twin S-LDEV 322 (via pointer 316"). And the data on twin S-LDEV 322 is consistent with the data on P-LDEV 104 as of the last time an update relative to P-LDEV 104 was completed (to be discussed in more detail below), e.g., as of the beginning of pair state 404. The data on twin S-LDEV 322 is consistent data that will become progressively more outdated as time elapses with respect to the current data on P-LDEV 104.

Downstream node 121 is not aware of there being twin S-LDEVs 306 and 322, moreover nor is it aware of which twin it is given access to at a given moment. Rather, downstream node 121 merely enjoys that disk array 300 makes consistent data more available to it more often than disk array 100 of the Background Art. For example, from the perspective of downstream node 121, the behavior of disk array 300 in pair state 404 resembles the behavior of S-LDEV 106 in the suspend state according to the Background Art.

Figure 6A:
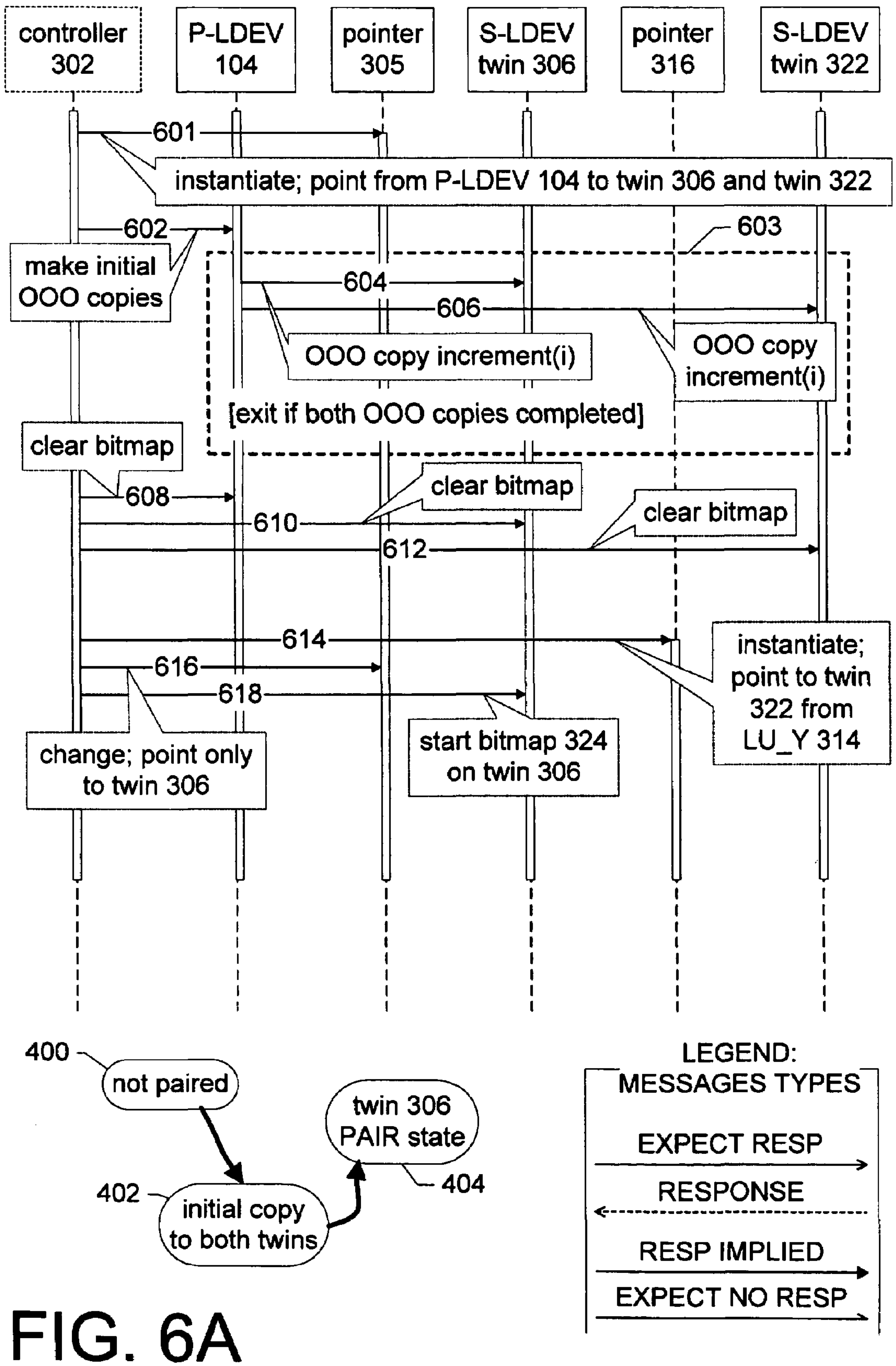

FIG. 6A is a sequence diagram of a method of transition into initial-copy state 402, and a method of transition into pair state 404 from initial-copy state 402, according to at least one embodiment of the present invention, respectively.

In FIG. 6A, transition into initial-copy state 402 from not-paired state 400 begins at message 601. At message 601, controller 302 instantiates (or in other words, establishes) pointer 305 as pointing from P-LDEV 104 to each of twin S-LDEVs 306 and 322. As a practical matter, instead of one pointer pointing at both of twin S-LDEVs 306 and 322, pointer 305 might be implemented as two pointers, e.g., a pointer 305' pointing to twin S-LDEV 306 and a pointer 305" pointing to twin S-LDEV 322. For simplicity, point 305 is described as having the capability to point at two targets.

It is assumed that there is data on P-LDEV 104 that should be copied to its mirroring LDEV. Next, at message 602, controller 302 commands P-LDEV 104 to make initial, full OOO copies of itself to the two targets of pointer 305. Such copies are made via a loop 603, which includes messages 604 and 606 from P-LDEV 104 to twin S-LDEVs 306 and 322, respectively. Messages 604 and 606 are $i^{th}$ incremental copies of data sourced from P-LDEV 104. Loop 603 can be exited when complete copies of the data on P-LDEV 104 have been made to each of twins S-LDEV 306 and 322. While the ith copy to twin S-LDEV 306 (message 604) has been indicated as occurring before the ith copy to twin S-LDEV 322 (message 606), alternatively message 606 could precede message 604. For uniformity of description, where an action is performed sequentially upon each of twin S-LDEVs 306 and 322, it will be assumed that the first action is upon twin S-LDEV 306 and the second action is upon twin S-LDEV 322. Alternatively, the action upon twin S-LDEV 322 can sometimes or always be made to sequentially precede the action upon twin S-LDEV 306.

After loop 603 is exited, controller 302 clears: a bitmap 326 on P-LDEV 104 (see FIG. 3B) at message 608; a bitmap 324 on twin S-LDEV 306 at message 610; and a corresponding bitmap (if any) on twin S-LDEV 322 at message 612. As noted above, for uniformity of description, message 610 to twin S-LDEV 306 is assumed to precede message 612 to twin S-LDEV 322. Alternatively, message 608 can succeed message 604 and/or message 612.

After message 612, initial-copy state 402 can be thought of as completed. Entry into pair state 404 (again, from the perspective of twin S-LDEV 306 vis-à-vis P-LDEV 104) begins at message 614.

At message 614, controller 302 instantiates pointer 316 as pointing from LU_Y 314 to twin S-LDEV 322 (which is shown as pointer 316" in FIG. 3A). At message 616, controller sets pointer 305 to point only to twin S-LDEV 306. At message 618, controller 302 starts bitmap 324 on twin S-LDEV 306 to keep track of updates thereto.

Discussion now returns to FIG. 3B.

A user can request that disk array 300 change from being in pair state 404 to suspend state 408. Such a request can be referred to as a suspend request. FIG. 3B is a version of FIG. 3A (and hence is a block diagram) illustrating aspects of the response by disk array 300 to a suspend request, according to at least one embodiment of the present invention.

Upon receiving a suspend request, disk array 300 transitions from pair state 404 to suspend state 408 during which the following can be done. Pointer 316 can remain mapped (as indicated by item 316") to LU_Y 314 from twin S-LDEV 322. First, controller 302 can momentarily block any attempt at writing to P-LDEV 104. Then disk array can enter synch & point state 406, where controller 302 can update twin S-LDEV 306 to be an accurate data mirror of P-LDEV 104. In pair state 404, pointer 305 can be mapped from P-LDEV 104 to twin S-LDEV 306. But in point & synch state 406, after twin S-LDEV 306 is updated, controller 302 can disconnect pointer 305. After pointer 305 is disconnected, controller 302 can again permit upstream node 119 to write new data to P-LDEV 104. A bitmap 326 of new data (or, in other words, updates) on P-LDEV 104 from application host 118 can be recorded.

Despite the possibility that updates to twin S-LDEV 306 might be needed at this point in suspend state 408 (because writes to P-LDEV 104 have again been permitted), no such updates to twin S-LDEV 306 can take place because pointer 305 has been disconnected. Next, controller 302 can temporarily block any attempt to read LU_Y 314, can remap pointer 316 to point from LU_Y 314 to twin S-LDEV 306 (pointer 316 is illustrated with item number 316' in FIG. 3B to indicate the mapping to twin S-LDEV 306), and then can resume accepting read attempts at LU_Y 314. After remapping in the form of pointer 316', controller 302 can copy tracks from twin S-LDEV 306 to twin S-LDEV 322 corresponding to bits set in bitmap 324 (that indicate updated data on twin S-LDEV 306 relative to twin S-LDEV 322). Bitmaps 324 and 326 can then be cleared. Recording of bitmaps 324 and 326 can begin again to record writes to LU_X 110 and LU_Y 314 during suspend state 408.

Figure 6B:
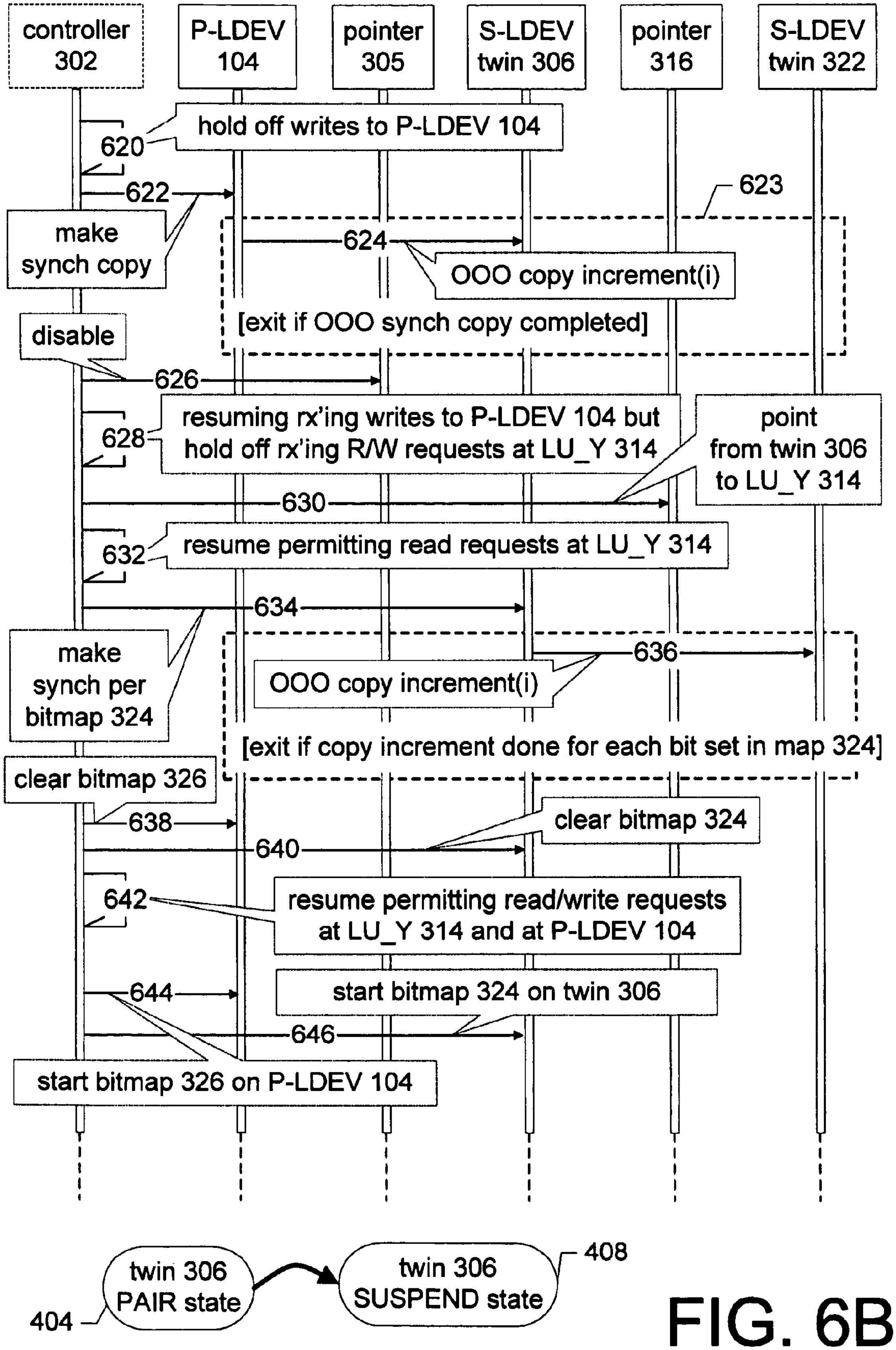

FIG. 6B is a sequence diagram of a method of transition into suspend state 408 from pair state 404, according to at least one embodiment of the present invention, respectively.

In FIG. 6B, transition into suspend state 408 (again, from the perspective of twin S-LDEV 306 vis-à-vis P-LDEV 104) begins with disk 300 entering synch & point state 406. In synch & point state 406, at self-message 620, controller 302 holds off writes to P-LDEV 104 received at LU_X 110. At message 622, controller 302 commands P-LDEV 104 to make an OOO synch copy of itself to the target of pointer 305, which was changed back at message 616 to identify only twin S-LDEV 306. Such a copy is made via a loop 623, which includes a message 624 from P-LDEV 104 to twin S-LDEV 306. Message 624 is an $i^{th}$ incremental copy of data sourced from P-LDEV 104. Loop 623 can be exited when a complete copy of the data on P-LDEV 104 has been made to twin S-LDEV 306.

After loop 623 is exited, controller 302 disables pointer 305 at message 626. At self-message 628, controller 302 resumes receiving writes to P-LDEV 104 at LU_X 110 but holds off read/write requests received at LU_Y 314. At message 630, controller 302 changes pointer 316 to point from LU_Y 314 to twin S-LDEV 306 (which is shown as pointer 316' in FIG. 3B).

At self-message 632, controller 302 resumes permitting read requests at LU_Y 314. Downstream node 121 is unaware of there being twin S-LDEVs 306 and 322. Rather, from the perspective of downstream node 121, there appears only to be a singleton S-LDEV. But such a faux-singleton S-LDEV differs from singleton S-LDEV 106 of the Background Art in behavior because the faux-singleton S-LDEV can provide consistent data to downstream node 121 more often, as will be discussed further below.

At message 634, controller 302 commands twin S-LDEV 306 to make an OOO synch copy of itself to twin S-LDEV 322. This can be done, in part, e.g., via the use of a pointer (not depicted) that points from twin S-LDEV 306 to twin S-LDEV 322 based upon the changes that were made to twin S-LDEV 306 during the previous pair state 404, as recorded in bitmap 324 on twin S-LDEV 306. Such a copy is made via a loop 635, which includes a message 636 from twin S-LDEV 306 to twin S-LDEV 322. Message 624 is an $i^{th}$ incremental copy of data sourced from twin S-LDEV 306. Loop 635 can be exited when a copy increment(i) has been done for each bit set in bitmap 324.

After loop 635 is exited, controller 302 clears: bitmap 326 on P-LDEV 104 at message 638; and bitmap 324 on twin S-LDEV 306 at message 640. Disk 300 leaves synch & point state 406 after message 640 and enters suspend state 408 at self-message 642, where controller 302 resumes permitting writes to P-LDEV 104 received at LU_X 110 and read/write requests received at LU_Y 314. At message 644, controller 302 starts bitmap 326 on P-LDEV 104. At message 646, controller 302 starts bitmap 324 on twin S-LDEV 306.

In FIG. 6B, alternatively, the following are some of the changes to the sequence that could be made: messages 638 and 640 could change places; and messages 644 and 646 could change places.

Discussion now returns to FIG. 3C.

A user can request that disk array 300 transition from being in suspend state 408 to pair state 404, which takes place by way of resynch state 412. FIG. 3C is a version of FIG. 3A (and hence is a block diagram) illustrating aspects of the response by disk array 300 to a normal resynch request, according to at least one embodiment of the present invention.

Upon receiving the normal resynch request, controller 302 can temporarily block any attempt to read LU_Y 314, can remap pointer 316 (as indicated by item 316") to point to twin S-LDEV 322 from LU_Y 314, and then can resume accepting read attempts at LU_Y 314. In a normal resynch, any changes made to the data on twin S-LDEV 306 while in suspend state 406 are not present on S-LDEV, and will be, e.g., discarded.

Next, controller 302 can arrange for S-LDEV 306 to be updated relative to P-LDEV 104, as follows. Controller 302 can logically OR together bitmaps 324 and 326, can overwrite bitmap 324 with the result of the OR operation and can clear bitmap 326. Controller 302 can then reinstate pointer 305 (pointing from P-LDEV 104 to S-LDEV 306) and can copy changed tracks from P-LDEV 104 to twin S-LDEV 306 corresponding to bits set in the OR'ed bitmap 324 (that indicates updated data on P-LDEV 104 relative to twin S-LDEV 306).

After updating twin S-LDEV 306, controller 302 can arrange for twin S-LDEV 322 to be updated relative to twin S-LDEV 306, as follows. Any attempt to read LU_Y 314 can be temporarily blocked. Pointer 316 (as indicated by item 316') can be remapped to point to twin S-LDEV 306 from LU_Y 314, and then acceptance of read attempts at LU_Y 314 can resume plus pointer 305 can be disconnected. Tracks can be copied from twin S-LDEV 306 to twin S-LDEV 322 corresponding to bits set in bitmap 324, and then bitmap 324 can be cleared.

After S-LDEV 322 is updated, reading of S-LDEV 322 and updating of S-LDEV 306 can resume as follows. Any attempt to read LU_Y 314 can be temporarily blocked, pointer 316 (as indicated by item 316") can be remapped to point from S-LDEV 322 to LU_Y 314, and then acceptance of read attempts at LU_Y 314 can be resumed. Pointer 305 can be reinstated and updates to S-LDEV 306 can be recorded in bitmap 324.

Figure 6C:
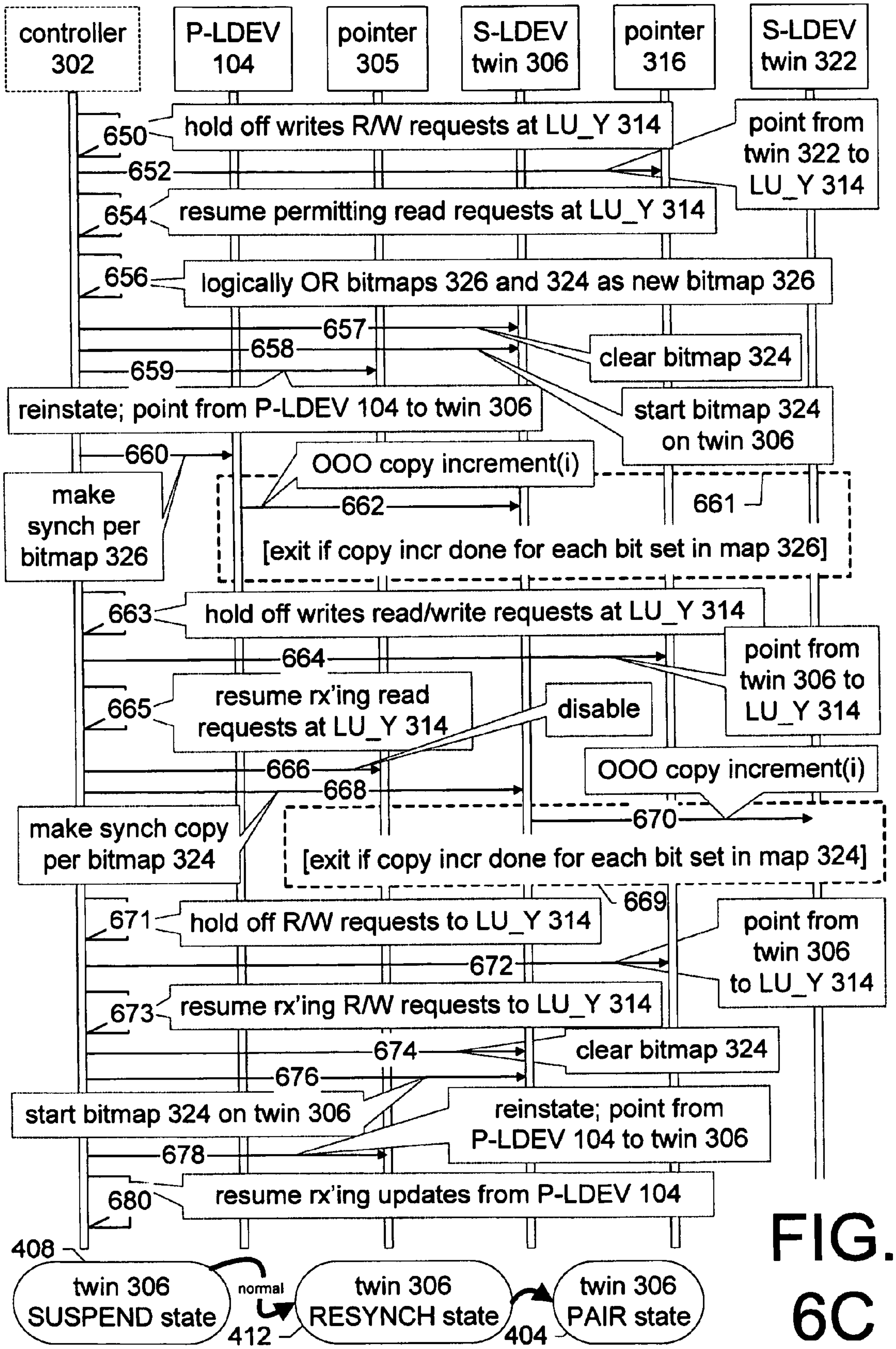

FIG. 6C is a sequence diagram of a method of normal resynch transition into resynch state 412 from suspend state 408 and then back to pair state 404 from resynch state 412, according to at least one embodiment of the present invention, respectively.

In FIG. 6C, transition into resynch state 412 (again, from the perspective of twin S-LDEV 306 vis-à-vis P-LDEV 104) from suspend state 408 begins with disk 300 entering synch & point state 406. In synch & point state 406, at self-message 650, controller 302 holds off read/write requests received at LU_Y 314. At message 652, controller 302 changes pointer 316 to point from LU_Y 314 to twin S-LDEV 322. Disk 300 leaves synch & point state 406 after message 652 and enters discard state 410 at self-message 654.

At self-message 654, controller 302 resumes permitting read requests at LU_Y 314. At self-message 656, controller 302 logically OR's together bitmaps 326 and 324 and overwrites bitmap 326 with the result. Self-message 656, in other words, discards the changes that had been mapped in bitmap 324, as is called for in a normal resynch. Alternatively, disk 300 can leave synch & point state 406 after message 654 and enter discard state 410 at self-message 656. At message 657, controller 302 clears bitmap 324.

Disk 300 leaves discard state 410 after message 657 and enters resynch state 412 at message 658. At message 658, controller 302 starts bitmap 324. At message 659, controller 302 reinstates pointer 305 as pointing only to twin S-LDEV 306 from P-LDEV 104. At message 660, controller 302 commands P-LDEV 104 to make an OOO synch copy of the tracks represented in bitmap 326 to the target of pointer 305, namely twin S-LDEV 306. Such a copy is made via a loop 661, which includes a message 662 from P-LDEV 104 to twin S-LDEV 306. Message 662 is an $i^{th}$ incremental copy of data sourced from P-LDEV 104. The OOO nature of the synch copy of loop 661 renders the data on twin S-LDEV 306 inconsistent, which is indicated by cross-hatching in FIG. 4A.

Loop 661 can be exited when a complete copy of the data on P-LDEV 104 has been made to twin S-LDEV 306. After loop 661 is exited, controller holds off read/write requests received at LU_Y 314. At message 664, controller 302 changes pointer 316 to point from LU_Y 314 to twin S-LDEV 306. At self-message 654, controller 302 resumes permitting read requests at LU_Y 314. At message 666, controller 302 disables pointer 305.

Disk array 300 leaves resynch state 412 after message 666 and enters synch & point state 406 at message 668. At message 668, controller 302 commands twin S-LDEV 306 to make an OOO synch copy of itself to twin S-LDEV 322. Such a copy is made via a loop 669, which includes a message 670 from S-LDEV 306 to twin S-LDEV 322. Message 670 is an $i^{th}$ incremental copy of data sourced from twin S-LDEV 306. Loop 669 can be exited when a complete copy of the data on S-LDEV 306 has been made to twin S-LDEV 322.

At self-message 671, controller 302 holds off read/write requests to LU_Y 314 temporarily to permit time in which to change pointer 322. At message 672, controller sets pointer 316 to point from LU_Y 314 to twin S-LDEV 306. In a normal resynch, this does not (in effect) represent a change to pointer 316; but (as discussed below), this would represent a change if the resynch was a reverse resynch. At self-message 673, controller 302 resumes receiving read/write requests to LU_Y 314. At message 674, controller 302 clears bitmap 324. At message 676, controller 302 starts bitmap 424. At message 678, controller 302 reinstates pointer 305 to point only to twin S-LDEV 306.

Disk array 300 leaves synch & point state 406 after message 678 and enters pair state 406 at self-message 680. At self-message 680, controller 302 resumes receiving updates from P-LDEV 104 at LU_X 110.

Figure 6D:
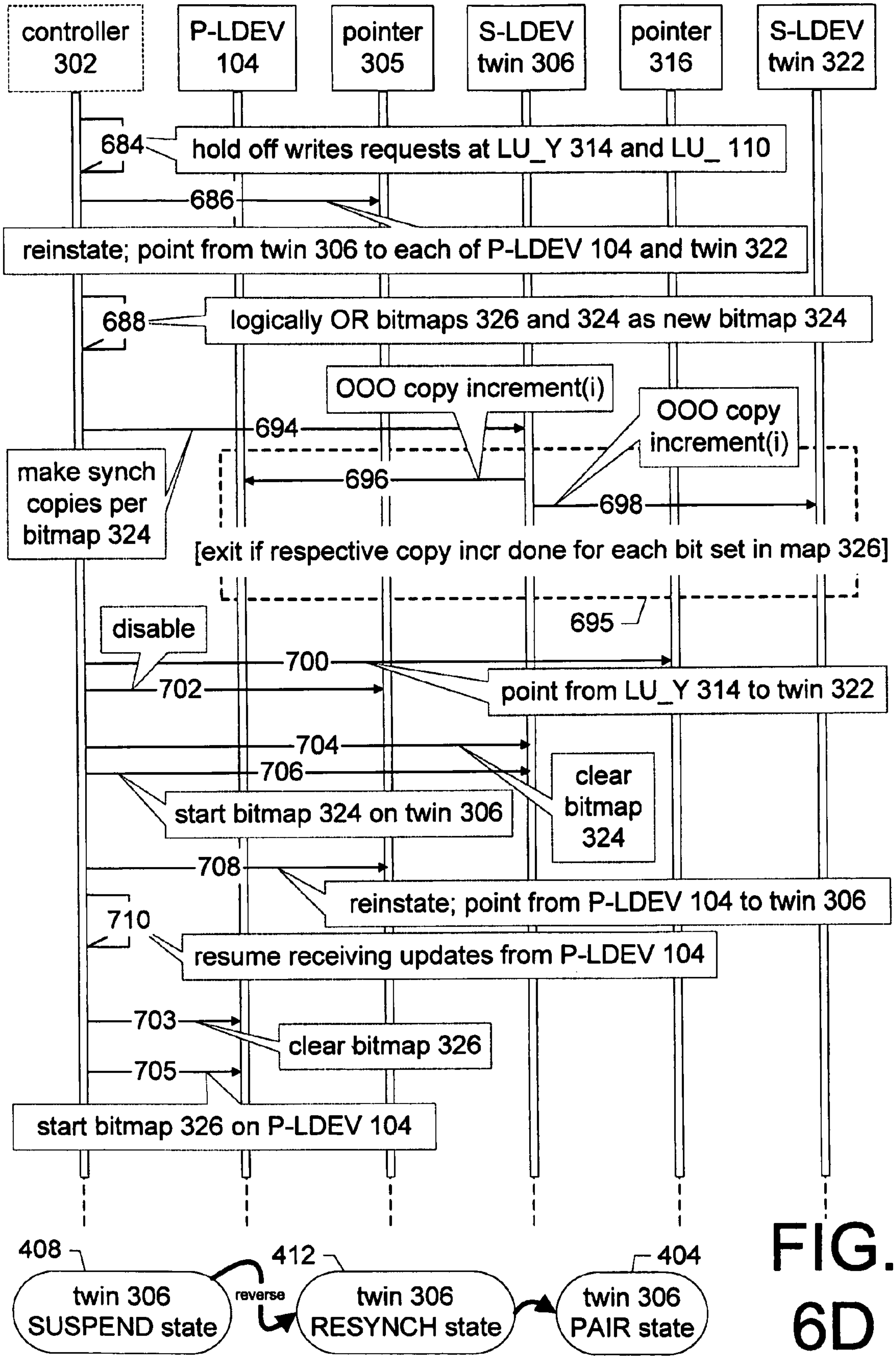

FIG. 6D is a sequence diagram of a method of reverse resynch transition into resynch state 412 from suspend state 408 and then back to pair state 404 from resynch state 412, according to at least one embodiment of the present invention, respectively.

In FIG. 6D, transition into resynch state 412 (again, from the perspective of twin S-LDEV 306 vis-à-vis P-LDEV 104) from suspend state 408 begins with disk 300 entering synch & point state 406. In synch & point state 406, at self-message 684, controller 302 holds off write requests received at LU_Y 314 and LU_Y 110. At message 686, controller 302 reinstates pointer 305 to point from twin S-LDEV 306 to each of P-LDEV 104 and S-LDEV 322. Disk 300 leaves synch & point state 406 after message 686 and enters discard state 410 at self-message 688.

At self-message 688, controller 302 logically OR's together bitmaps 326 and 324 and overwrites bitmap 324 with the result. Self-message 688, in other words, discards the changes that had been mapped in bitmap 326, as is called for in a reverse resynch.

Disk 300 leaves discard state 410 after message 688 and enters resynch state 412 at message 694. At message 694, controller 302 commands twin S-LDEV 306 to make an OOO synch copy of itself to the targets of pointer 305, namely P-LDEV 104 and twin S-LDEV 322. Such a copy is made via a loop 695, which includes a message 696 from twin S-LDEV 306 to P-LDEV 104, and a message 698 from twin S-LDEV 306 to twin S-LDEV 322. Each of messages 696 and 698 is an $i^{th}$ incremental copy of data sourced from twin S-LDEV 306. Loop 695 can be exited when respective copy increments(i) have been done for each bit set in bitmap 324.

After loop 695 is exited, disk array 300 leaves resynch state 412 and enters synch & point state 406. However, the synch copy that would otherwise be done here was already done in loop 695 via message 698. Hence, in a reverse resynch, only pointing is done in synch & point state 406, not any synchronizing. At message 700, controller 302 sets pointer 316 to point from LU_Y 314 to twin S-LDEV 322. In a reverse resynch, message 700 represents a change to pointer 316; but (as discussed above), this would not (in effect) represent a change if the resynch was a normal resynch. At message 702, controller 302 disables pointer 305. At message 703, controller 302 clears bitmap 326. At message 704, controller 302 clears bitmap 324. At message 706, controller 302 starts bitmap 324. At message 705, controller 302 starts bitmap 326. At message 708, controller 302 reinstates pointer 305 as pointing from P-LDEV 104 to twin S-LDEV 306.

Disk array 300 leaves point & synch state 406 after message 708 and enters pair state 404. Back in pair state 404, controller 302 finishes the resynch request by resuming receipt of updates for P-LDEV 104 at LU_X 110.

Above, it was mentioned that disk array 300 can represent a node N in a storage hierarchy. A block diagram of such a storage hierarchy 500 is depicted in FIG. 5, according to at least one embodiment of the present invention. Portions of disk array 300 are included in a first remote mirror 504 and a second remote mirror 502, respectively.

Remote mirror 502 has an architecture that includes a secondary volume (SVOL) 506 (corresponding to downstream node 121). Collectively, twin S-LDEVs 306 and 322 represent the primary volume of remote mirror 502. SVOL 506 can be part of an internal mirror as well, for which it could represent the primary volume.

Remote mirror 504 has an architecture that includes a primary volume (PVOL) 508 (corresponding to upstream node 119). P-LDEV 104 represents the SVOL of remote mirror 504. PVOL 508 can also be part of an internal mirror, for which it could represent the SVOL.

In storage hierarchy 500, if disk array 300 represents a storage node N, then: secondary volume 506 corresponds to a storage node N+1 (which reports hierarchically to storage node N); and primary volume 508 corresponds to a node N−1 (to which storage node N reports hierarchically).

FIG. 7A is a depiction of data consistency/inconsistency for a singleton S-LDEV at LU_Y 314 of a disk array having an internal mirror architecture, according to the Background Art.

FIG. 7B is a depiction of a data consistency/inconsistency for twin S-LDEVs at LU_Y 314 of a disk array having an internal mirror architecture, according to at least one embodiment of the present invention.

In FIG. 7A, Background Art disk array 100 makes available consistent data to downstream node 120 only during the suspend state. Inconsistent data is available at all other times, namely pair state 204 and (relatively brief) state-switching durations 702 and 704.

In contrast, as depicted in FIG. 7B, after the initial copy to archive pair state, disk array 300 makes available consistent data to downstream node 121 at all times although requests will be held off during the substantially instantaneous state-switching durations 706, 708 and 710. It is to be recalled that FIG. 7B is not drawn to scale. In particular, to simplify the depiction, the sizes of durations 706, 708 and 710 in FIG. 8B are depicted disproportionately large relative to the durations spent in the PAIR, SUSPEND and RESYNCH states.

Again, from the perspective of downstream node 121, there appears only to be a singleton S-LDEV. And that faux-singleton S-LDEV appears continually to be in a suspend state, albeit of a variety in which somehow (downstream node 121 does not understand how) the static data is periodically refreshed. The appearance of refreshed data is due to the presence of twin S-LDEVs 306 and 322 and the selective mapping from LU_Y 314 thereto, respectively. In contrast, disk array 100 of the Background Art has only a singleton S-LDEV 106.

Operation of disk 300 can be also be described as follows. Controller 302 reveals to downstream node 121 only one of twin S-LDEVs 306 and 322 at a given moment. In pair state 404 and (for a normal resynch) resynch state 412, twin S-LDEV 322 is revealed while twin S-LDEV 306 is concealed. In suspend state 408, twin S-LDEV 306 is revealed while twin S-LDEV 322 is concealed.

Embodiments of the present invention may be implemented using hardware or software code. In particular, they may be embodied as a physical device (e.g., tangible electronics), a combination of software objects, or a combination of both physical and software elements, as desired by design and implementation requirements and/or restraints.

The invention being thus described, it will be obvious that the same may be varied in many ways. Such variations are not to be regarded as a departure from the spirit and scope of the invention, and all such modifications are intended to be included within the scope of the present invention.

What is claimed:

1. A disk array having an internal mirror architecture, the disk array comprising: a plurality of disk drives configured to provide a primary logical storage device (LDEV), a first instance of an internally-mirroring secondary LDEV corresponding to the primary LDEV and a second instance of an internally-mirroring secondary LDEV also corresponding to the primary LDEV.

2. The disk array of claim 1, further comprising: a controller to selectively cause data updating to one of the instances of secondary LDEV while permitting reading by an external entity from the other instance of secondary LDEV.

3. The disk array of claim 2, wherein: the controller is operable, in a pair mode defined relative to the first instance of the secondary LDEV, to cause the data updating to be performed upon the first instance of secondary LDEV, and control the second instance of secondary LDEV to be available for the reading by the external entity.

4. The disk array of claim 3, wherein the controller is operable to cause the data updating to be sourced from the primary LDEV.

5. The disk array of claim 3, wherein: the controller is operable to transition from the pair mode to a suspend mode, the suspend mode being defined relative to the primary LDEV; and the controller is operable, in the suspend mode defined relative to the first instance of the secondary LDEV, to cause the data updating to be performed upon the second instance of secondary LDEV, and control the first instance of secondary LDEV, rather than the second instance of secondary LDEV, to be available for the reading by the external entity.

6. The disk array of claim 5, wherein the controller is operable in the suspend mode to cause the data updating to be sourced the first instance of secondary LDEV.

7. The disk array of claim 2, further comprising: a port via which the external entity can read from the disk array; and a pointer mapped to one of the first and second instances of secondary LDEV from the port; wherein the controller is operable to control whether the pointer is mapped to the first or second instance of secondary LDEV.

8. The disk array of claim 2, further comprising: a bitmap associated with the instance of secondary LDEV upon which the updating is performed; wherein the controller is operable to track, via the bitmap, updates to the instance of secondary LDEV being updated.

9. The disk array of claim 8, wherein the bitmap is a track-level bitmap.

10. The disk array of claim 2, wherein: the controller is operable, in a suspend mode defined relative to the first instance of the secondary LDEV, to cause the data updating to be performed upon the second instance of secondary LDEV, and control the first instance of secondary LDEV to be available for the reading by the external entity.

11. The disk array of claim 10, wherein the controller is operable, in the suspend mode, to cause the data updating to be sourced from the first instance of secondary LDEV.

12. The disk array of claim 10, wherein: the controller is operable to transition from the suspend mode to a pair mode, the pair mode being defined relative to the first instance of the secondary LDEV; and the controller is operable, in the pair mode, to cause the data updating to be performed upon the first instance of secondary LDEV, and control the second instance of secondary LDEV, rather than the first instance of secondary LDEV, to be available for the reading by the external entity.

13. The disk array of claim 12, wherein the controller is operable in the pair mode to cause the data updating to be sourced from the primary LDEV.

14. A disk array having an internal mirror architecture, the disk array comprising: primary means for providing a primary storage volume; a first instance of secondary means for providing a first instance of an internally-mirroring secondary storage volume corresponding to the primary storage volume; and a second instance of secondary means for providing a second instance of an internally-mirroring secondary storage volume also corresponding to the primary volume.

15. The disk array of claim 14, further comprising: control means for selectively causing one of the first and second instances of secondary-means to receive data updates while making the other of the first and second secondary-means available for reading by entity external to the disk array.

16. A disk array having an internal mirror architecture, the disk array comprising: a plurality of disk drives configured to provide a primary volume and an internally-mirroring secondary volume arrangement;

the internally-mirroring secondary volume arrangement including first and second instances of an internally-mirroring secondary volume corresponding to the primary volume respectively; and the internally-mirroring secondary volume arrangement being operable to concurrently engage in a pair relationship with the primary logical storage device and make data available to an external entity that is consistent with data on the primary volume.

17. The disk array of claim 16, wherein the secondary volume arrangement includes a first instance of an internally-mirroring secondary logical device (LDEV) operable to engage in the pair relationship and a second instance of an internally-mirroring secondary LDEV operable to present the consistent data to the external entity.

18. A disk array having an internal mirror architecture, the disk array comprising:

a plurality of disk drives configured to provide a primary logical storage device (LDEV), and first and second instances of an internally-mirroring secondary LDEV corresponding to the primary LDEV, respectively; and a controller operable to generate a first mapping from the first instance of secondary LDEV to at least one of the primary LDEV and the second instance of secondary LDEV, generate a second mapping from the first instance of secondary LDEV to at least one of the primary LDEV and the second instance of secondary LDEV, and selectively cause data updating according to the first mapping while permitting reading by an external entity according to the second mapping.

19. The disk array of claim 18, wherein the controller is further operable, in a pair mode defined relative to the first instance of the secondary LDEV, to: set the first mapping to target the first instance of secondary LDEV; and set the second mapping to target the second instance of secondary LDEV.

20. The disk array of claim 19, wherein the controller is further operable to transition from the pair mode to a suspend mode, the suspend mode being defined relative to the primary LDEV, by: changing the first mapping to target the second instance of secondary LDEV; and changing the second mapping to target the first instance of secondary LDEV.

21. The disk array of claim 18, wherein the first and second mappings are pointers in a memory available to the controller.

22. The disk array of claim 18, further comprising: a bitmap associated with the instance of secondary LDEV from which the first mapping points; wherein the controller is operable to track, via the bitmap, updates to the instance of secondary LDEV being updated.

23. The disk array of claim 22, wherein the bitmap is a track-level bitmap.

24. The disk array of claim 18, wherein the controller is further operable, in a suspend mode defined relative to the first instance of the secondary LDEV, to: set the first mapping to target the second instance of secondary LDEV; and set the second mapping to target the first instance of secondary LDEV.

25. The disk array of claim 19, wherein the controller is further operable to transition from the suspend mode to a pair mode, the pair mode being defined relative to the primary LDEV, by: changing the first mapping to target the second instance of secondary LDEV; and changing the second mapping to target the first instance of secondary LDEV.

26. The disk array of claim 25, wherein the controller is further operable to reach the pair mode via undergoing a resynch mode, the resynch mode being defined relative to the primary LDEV, by: discarding changes in data that accumulated at one of the primary L-DEV and the first instance of secondary LDEV during the suspend mode; and changing the first mapping to target at least the primary LDEV.

27. The disk array of claim 26, wherein the controller is further operable in a normal version of the resynch mode to: discard the changes in data accumulated at the primary LDEV during the suspend mode; change the first mapping to target each of the primary LDEV and the second instance of secondary LDEV; and block use of the second mapping temporarily.

28. The disk array of claim 26, wherein the controller is further operable in a reverse version of the resynch mode to: discard the changes in data accumulated at the first instance of secondary LDEV during the suspend mode; change the first mapping to target the primary LDEV; and change the second mapping to target the second instance of secondary LDEV.

29. A data storage network hierarchy comprising:

a storage node N; and a storage node N+1 reporting hierarchically to the first storage node N;

the storage node N corresponding to a disk array having an internal mirror architecture that includes a plurality of disk drives configured to provide a primary logical storage device (LDEV), a first instance of an internally-mirroring secondary LDEV corresponding to the primary LDEV and a second instance of an internally-mirroring secondary LDEV also corresponding to the primary LDEV;

the storage nodes N and N+1 being arranged in a remote mirror architecture having a primary volume on the storage node N corresponding dynamically to one of the first and second instances of secondary LDEV and a secondary volume on the storage node N+1.

30. The data storage network of claim 29, further comprising: a storage node N−1 to which the storage node N reports hierarchically; the storage nodes N−1 and N being arranged in a remote mirror architecture having a primary volume on the storage node N−1 and a secondary volume on the storage node N corresponding to the primary LDEV.

31. The data storage network of claim 29, wherein the disk array corresponding to storage node N further includes a controller operable to selectively cause data updating to one of the instances of secondary LDEV while mapping the other instance of secondary LDEV to the storage node N+1.

32. A disk array having an internal mirror architecture, the disk array comprising: primary means for providing a primary storage volume; a first instance of secondary means for providing a first instance of an internally-mirroring secondary storage volume corresponding to the primary storage volume; a second instance of secondary means for providing a second instance of an internally-mirroring secondary storage volume also corresponding to the primary storage volume; first mapping means for mapping from the first instance of secondary LDEV to at least one of the primary LDEV and the second instance of secondary LDEV; second mapping means for mapping from the first instance of secondary LDEV to at least one of the primary LDEV and the second instance of secondary LDEV, and updating means for selectively cause updating data according to the first mapping means while permitting reading according to the second mapping means.

33. A method of operating disk array having a plurality of disk drives configured according to an internal mirror architecture that provides a primary logical storage device (LDEV), a first instance of an internally-mirroring secondary LDEV (S-LDEV) corresponding to the primary LDEV and a second instance of an internally-mirroring S-LDEV also corresponding to the primary LDEV, the method comprising: selectively causing data updating upon one of the instances of S-LDEV while permitting reading by an external entity from the other instance of S-LDEV.

34. The method of claim 33, wherein, in a pair mode defined relative to the first instance of S-LDEV: the causing more particularly includes causing the data updating to be performed upon the first instance of S-LDEV; and the permitting includes controlling the second instance of S-LDEV to be available for the reading by the external entity.

35. The method of claim 34, wherein the causing more particularly includes causing the data updating to be sourced from the primary LDEV.

36. The method of claim 34, further comprising: transitioning from the pair mode to a suspend mode, the suspend mode being defined relative to the first instance of S-LDEV; wherein the suspend mode includes causing the data updating to be performed upon the second instance of S-LDEV, and controlling the first instance of S-LDEV, rather than the second instance of S-LDEV, to be available for the reading by the external entity.

37. The method of claim 36, wherein, in the suspend mode, the causing more particularly includes causing the data updating to be sourced from the first instance of S-LDEV.

38. The method of claim 33, wherein: there exists a port of the disk array via which the external entity can read from the disk array, and a pointer mapped from to one of the first and second instances of S-LDEV from the port; and the permitting includes controlling whether the pointer is mapped to the first or second instance of S-LDEV.

39. The method of claim 33, further comprising: providing a bitmap in association with the instance of S-LDEV upon which the updating is performed; and tracking updates, via the bitmap, to the instance of S-LDEV being updated.

40. The method of claim 39, wherein the bitmap is a track-level bitmap.

41. The method of claim 33, wherein, in a suspend mode defined relative to the first instance of S-LDEV: the causing more particularly includes causing the data updating to be performed upon the second instance of S-LDEV; and the permitting includes controlling the first instance of S-LDEV to be available for the reading by the external entity.

42. The method of claim 41, wherein, in the suspend mode, the causing more particularly includes causing the data updating to be sourced from the first instance of S-LDEV.

43. The method of claim 41, further comprising: transitioning from the suspend mode to a pair mode, the pair mode being defined relative to the first instance of S-LDEV; wherein the pair mode includes causing the data updating to be performed upon the first instance of S-LDEV, and controlling the second instance of S-LDEV, rather than the first instance of S-LDEV, to be available for the reading by the external entity.

44. The method of claim 43, wherein, in the pair mode, the causing more particularly includes causing the data updating to be sourced from the primary LDEV.

45. A method of operating disk array having a plurality of disk drives configured according to an internal mirror architecture that provides a primary logical storage device (LDEV), a first instance of an internally-mirroring secondary LDEV (S-LDEV) corresponding to the primary LDEV and a second instance of an internally-mirroring S-LDEV also corresponding to the primary LDEV, the method comprising: generating a first mapping from the first instance of secondary LDEV to at least one of the primary LDEV and the second instance of secondary LDEV, generating a second mapping from the first instance of secondary LDEV to at least one of the primary LDEV and the second instance of secondary LDEV, and selectively causing data updating according to the first mapping while permitting reading by an external entity according to the second mapping.

46. The method of claim 45, wherein: the selectively causing includes operating in a pair mode defined relative to the first instance of S-LDEV; the generating of the first mapping in the pair mode includes setting the first mapping to target the first instance of secondary LDEV; and the generating of the second mapping in the pair mode includes setting the second mapping to target the second instance of secondary LDEV.

47. The method of claim 46, wherein: the selectively causing further includes transitioning from the pair mode to a suspend mode, the suspend mode being defined relative to the primary LDEV; the generating of the first mapping in the suspend mode includes changing the first mapping to target the second instance of secondary LDEV; and the generating of the second mapping in the suspend mode includes changing the second mapping to target the first instance of secondary LDEV.

48. The method of claim 45, wherein: the generating of the first mapping includes instantiating a first pointer in a memory; and the generating of the second mapping includes instantiating a first pointer in the memory.

49. The method of claim 45, further comprising: generating a bitmap associated with the instance of secondary LDEV from which the first mapping points; and tracking, via the bitmap, updates to the instance of secondary LDEV being updated.

50. The method of claim 49, wherein the bitmap is a track-level bitmap.

51. The method of claim 45, wherein the selectively causing includes operating in a suspend mode defined relative to the first instance of S-LDEV; the generating of the first mapping in the suspend mode includes setting the first mapping to target the second instance of secondary LDEV; and the generating of the second mapping in the suspend mode includes setting the second mapping to target the first instance of secondary LDEV.

52. The method of claim 51, wherein: the selectively causing further includes transitioning from the suspend mode to a pair mode, the pair mode being defined relative to the primary LDEV; the generating of the first mapping in the pair mode includes changing the first mapping to target the first instance of secondary LDEV; and the generating of the second mapping in the pair mode includes changing the second mapping to target the second instance of secondary LDEV.

53. The method of claim 51, wherein: the transitioning from the suspend mode to the pair mode further includes undergoing a resynch mode before undergoing the pair mode; the undergoing of the resynch mode including discarding changes in data that accumulated at one of the primary L-DEV and the first instance of secondary LDEV during the suspend mode; and changing the first mapping to target at least the primary LDEV.

54. The method of claim 53, wherein: the discarding of changes includes discarding the changes in data accumulated at the primary LDEV during the suspend mode; the changing of the first mapping includes changing the first mapping to target each of the primary LDEV and the second instance of secondary LDEV; and the undergoing of the resynch mode further includes blocking use of the second mapping temporarily.

55. The method of claim 53, wherein: the discarding of changes includes discarding the changes in data accumulated at the first instance of secondary LDEV during the suspend mode; the changing of the first mapping includes changing the first mapping to target the primary LDEV; and the undergoing of the resynch mode further includes changing the second mapping to target the second instance of secondary LDEV.

* * * * *

UNITED STATES PATENT AND TRADEMARK OFFICE
CERTIFICATE OF CORRECTION

PATENT NO. : 7,366,857 B2
APPLICATION NO. : 10/835115
DATED : April 29, 2008
INVENTOR(S) : Robert A. Cochran et al.

It is certified that error appears in the above-identified patent and that said Letters Patent is hereby corrected as shown below:

On sheet 11 of 12, fig. 6D, in box 684, delete "LU_ 110" and insert -- LU_X 110 --, therefor.

In column 12, line 1, delete "LU_Y 110" and insert -- LU_X 110 --, therefor.

In column 14, line 19, in Claim 6, after "sourced" insert -- from --.

In column 16, line 10, in Claim 26, delete "L-DEV" and insert -- LDEV --, therefor.

In column 17, line 40, in Claim 38, after "mapped" delete "from".

In column 18, line 48, in Claim 51, after "wherein" insert -- : --.

In column 19, line 4, in Claim 53, delete "L-DEV" and insert -- LDEV --, therefor.

Signed and Sealed this

Thirtieth Day of September, 2008

Jon W. Dudas

JON W. DUDAS
*Director of the United States Patent and Trademark Office*